United States Patent
Kumar et al.

(10) Patent No.: US 12,380,617 B2
(45) Date of Patent: Aug. 5, 2025

(54) VISUAL REORDERING OF PARTIAL VECTOR OBJECTS

(71) Applicant: Adobe Inc., San Jose, CA (US)

(72) Inventors: Harish Kumar, Noida (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 395 days.

(21) Appl. No.: 17/896,342

(22) Filed: Aug. 26, 2022

(65) Prior Publication Data

US 2024/0070944 A1    Feb. 29, 2024

(51) Int. Cl.
*G06T 11/60*    (2006.01)

(52) U.S. Cl.
CPC .......... *G06T 11/60* (2013.01); *G06T 2210/36* (2013.01)

(58) Field of Classification Search
CPC .... G06T 11/60; G06T 2210/36; G06T 11/203
See application file for complete search history.

(56) References Cited

U.S. PATENT DOCUMENTS

| | | | | |
|---|---|---|---|---|
| 10,997,770 | B1 * | 5/2021 | Kumawat | G06F 40/109 |
| 12,271,976 | B2 | 4/2025 | Kumar et al. | |
| 2017/0352171 | A1 * | 12/2017 | Kumar | G06T 11/00 |
| 2018/0315216 | A1 * | 11/2018 | Beri | G06T 11/40 |
| 2019/0019333 | A1 * | 1/2019 | Kumar | G06T 15/405 |
| 2020/0020139 | A1 * | 1/2020 | Kumar | G06T 11/001 |
| 2020/0219287 | A1 * | 7/2020 | Phogat | G06T 17/20 |
| 2020/0242823 | A1 * | 7/2020 | Gehlaut | G06T 11/40 |
| 2020/0372695 | A1 * | 11/2020 | Beri | G06T 11/001 |
| 2021/0134037 | A1 * | 5/2021 | Beri | G06T 11/40 |
| 2021/0333960 | A1 * | 10/2021 | Beri | G06F 3/0486 |
| 2024/0212242 | A1 | 6/2024 | Kumar et al. | |
| 2024/0257408 | A1 | 8/2024 | Kumar et al. | |

OTHER PUBLICATIONS

Kumar, Harish, et al., "US Application as Filed", U.S. Appl. No. 18/160,483, filed Jan. 27, 2023, 65 pages.
Kumar, Harish, et al., "US Application as Filed", U.S. Appl. No. 18/145,915, filed Dec. 23, 2022, 50 pages.
Sun, et al., "Image Vectorization using Optimized Gradient Meshes", ACM Transactions on Graphics, vol. 26 No. 3 [retrieved Nov. 14, 2022]. Retrieved from the Internet <https://web.archive.org/web/20140804205101id_/http://research.microsoft.com/pubs/69442/imagevectorization_siggraph07.pdf>., Jul. 2007, 7 pages.

(Continued)

*Primary Examiner* — Jin Cheng Wang
(74) *Attorney, Agent, or Firm* — FIG. 1 Patents

(57) ABSTRACT

In implementations of systems for visual reordering of partial vector objects, a computing device implements an order system to receive input data describing a region specified relative to a group of vector objects that includes a portion of a first vector object and a portion of second vector object. A visual order as between the portion of the first vector object and the portion of the second vector object within the region is determined. The order system computes a modified visual order as between the portion of the first vector object and the portion of the second vector object within the region based on the visual order. The order system generates the group of vector objects for display in a user interface using a render surface and a sentinel value to render pixels within the region in the modified visual order.

20 Claims, 16 Drawing Sheets

(56) References Cited

OTHER PUBLICATIONS

"Corrected Notice of Allowability", U.S. Appl. No. 18/160,483, filed Mar. 12, 2025, 2 pages.
"Non-Final Office Action", U.S. Appl. No. 18/160,483, filed Dec. 27, 2024, 9 pages.
"Notice of Allowance", U.S. Appl. No. 18/160,483, filed Jan. 24, 2025, 5 pages.
Johnson, et al., "Image Generation From Scene Graphs", Proceedings of the IEEE Conference on Computer Vision and Pattern Recognition (CVPR), 2018, pp. 1219-1228, 2018, 10 pages.
"Restriction Requirement", U.S. Appl. No. 18/145,915, filed Jun. 18, 2025, 6 pages.

* cited by examiner

700

702
Receive input data describing a region specified relative to a group of vector objects that includes a portion of a first vector object and a portion of a second vector object 704
Determine a visual order as between the portion of the first vector object and the portion of the second vector object within the region 706
Compute a modified visual order as between the portion of the first vector object and the portion of the second vector object within the region based on the visual order 708
Generate the group of vector objects for display in a user interface using a render surface and a sentinel value to render pixels of the portion of the first vector object and the portion of the second vector object in the modified visual order

*Fig. 7*

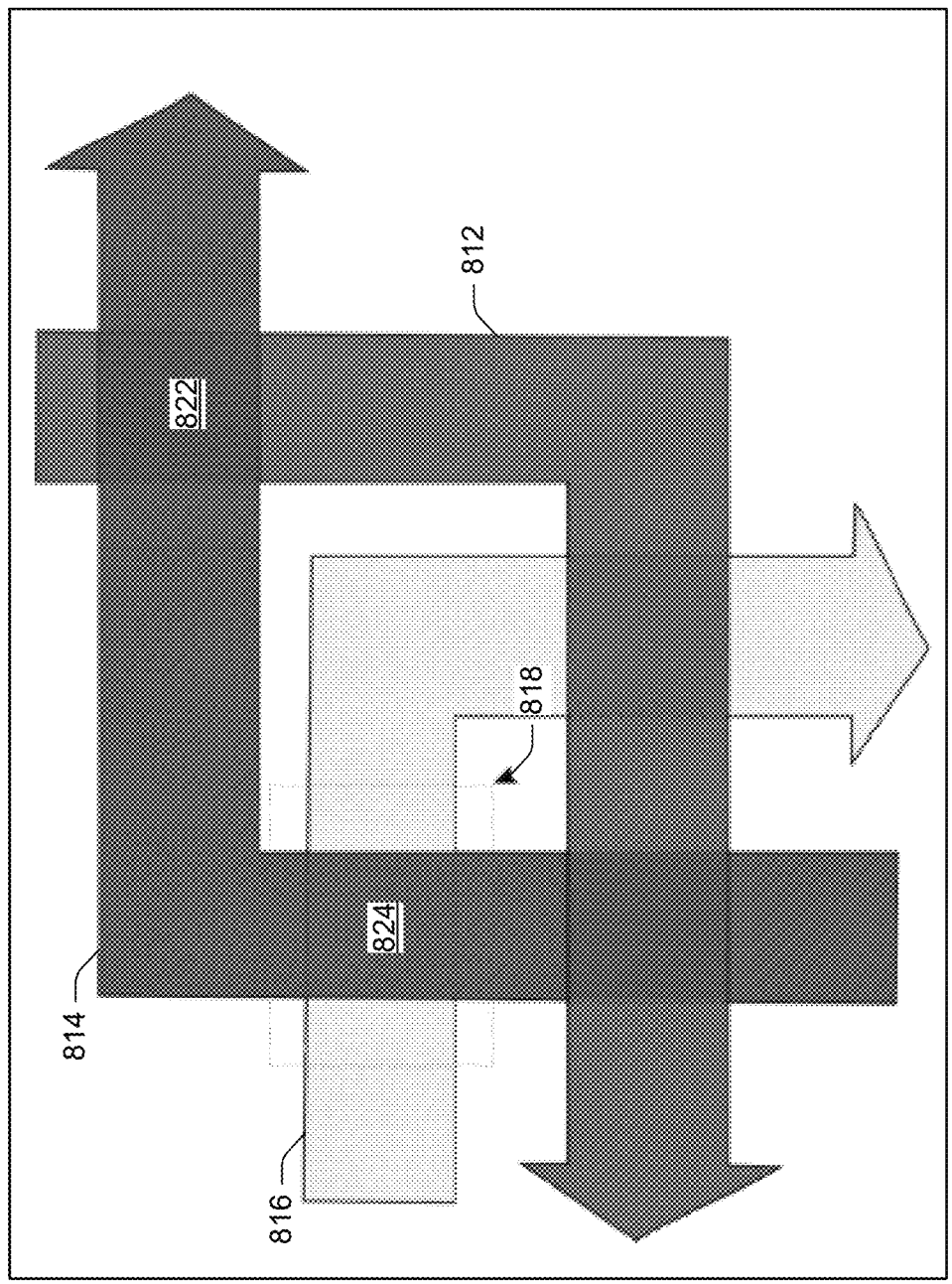

VISUAL REORDERING OF PARTIAL VECTOR OBJECTS

BACKGROUND

Localized reordering of portions of vector objects creates an appearance of depth between the portions of the vector objects in which some portions of a first vector object appear above a second vector object while other portions of the first vector object appear below the second vector object. In order to generate such an "intertwined" appearance between the first and second vector objects using conventional systems, a user manipulates an input device (e.g., a mouse, a stylus, or a touchscreen) relative to a user interface of an application for editing digital content displaying the vector objects. The user then manually adds and/or removes portions of the first and second vector objects via manipulation of the input device to create the appearance of depth. This process is tedious and prone to user error and also requires destruction of original geometries of the first and second vector objects which is a shortcoming of the conventional systems.

SUMMARY

Techniques and systems for visual reordering of partial vector objects are described. In an example, a computing device implements an order system to receive input data describing a region specified relative to a group of vector objects that includes a portion of a first vector object and a portion of a second vector object. The order system determines a visual order of as between the portion of the first vector object and the portion of the second vector object within the region.

A modified visual order as between the portion of the first vector object and the portion of the second vector object within the region is computed based on the visual order. For example, the portion of the first vector object appears above the portion of the second vector object in the visual order and the portion of the first vector object appears below the portion of the second vector object in the modified visual order. The order system generates the group of vector objects for display in a user interface using a render surface and a sentinel value to render pixels of the portion of the first vector object and the portion of the second vector object in the modified visual order.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 7 is a flow diagram depicting a procedure in an example implementation in which a visual order as between a portion of a first vector object and a portion of a second vector object included in a region is determined and a modified visual order as between the portion of the first vector object and the portion of the second vector object is determined based on the visual order.

FIGS. 8A, 8B, 8C, 8D, 8E, and 8F illustrate a representation of an example user interface for visual reordering of partial vector objects.

DETAILED DESCRIPTION

Overview

Figure 1:
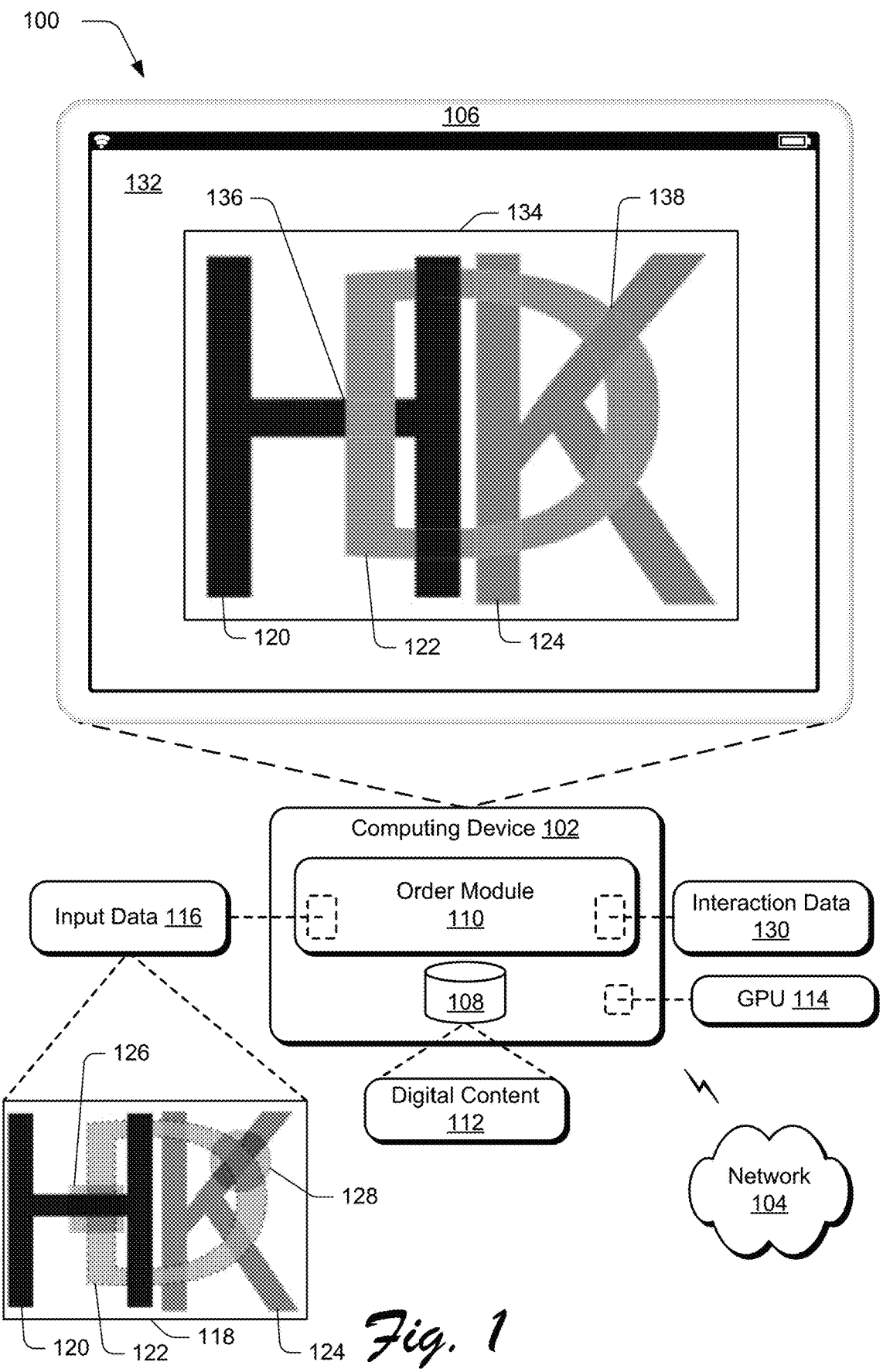
FIG. 1 is an illustration of an environment in an example implementation that is operable to employ digital systems and techniques for visual reordering of partial vector objects as described herein.

In order to generate an appearance of depth between a first vector object and a second vector object using conventional systems, a user manipulates an input device (e.g., a stylus, a touchscreen, a mouse, a keyboard, etc.) relative to a user interface of an application for editing digital content displaying the first and second vector objects. The user then manually adds and/or removes portions of the first and second vector objects via manipulation of the input device to create the appearance of depth in which a portion of the first vector object appears before or in front of the second vector object and another portion of the first vector object appears after or behind the second vector object. Creating the appearance of depth in this manner is tedious and prone to user error and also fails to preserve original geometries of the first and second vector objects which is a shortcoming of the conventional systems.

In order to overcome the limitations of conventional systems, techniques and systems for visual reordering of partial vector objects are described. In one example, a computing device implements an order system to receive input data and interaction data. For example, the input data describes a group of vector objects, a particular vector object included in the group of vector objects, and a region that includes a portion of the particular vector object and a portion of an additional vector object included in the group of vector objects. A user interacts with an input device relative to a user interface of an application for editing digital content to generate the interaction data. In some examples, the user interacts with the input device to specify the group of vector objects, the particular vector object, and/or the region described by the input data.

The order system determines a visual order as between the portion of the particular vector object and the portion of the additional vector object within the region. In one example, the order system computes a modified visual order as between the portion of the particular vector object and the portion of the additional vector object within the region. For instance, the order system is capable of computing the modified visual order automatically and without additional user intervention based on the visual order in some scenarios. Examples of such scenarios include a scenario in which there is only one possible modified visual order as between portions of vector objects within the region, a scenario in which the particular vector object is a topmost or bottommost vector object within the region, and so forth. The order system is also capable of computing the modified visual order based on receiving the interaction data generated by the user as describing a visual reordering as between the portion of the particular vector object and the portion of the additional vector object within the region.

The order system generates the group of vector objects having the modified visual order within the region for display in the user interface. In an example, the order system generates the group of vector objects non-destructively with respect to an original geometry of the particular vector object and with respect to an original geometry of the additional vector object which is not possible using conventional systems. Additionally, the order system is capable of receiving the interaction data as describing additional regions specified by the user via the input device to include in the group of vector objects and/or deletion of existing regions from the group of vector objects such as the region.

Consider examples in which the user interacts with the input device relative to the user interface of the application for editing digital content to specify an additional region to include in the group of vector objects. In a first example, the user generates the interaction data as describing an additional region that fully overlaps or contains the region and only includes the portion of the particular vector object and the portion of the additional vector object in the modified visual order. In this first example, the order system receives and processes the interaction data to combine the additional region with the region and changes the modified visual order of the portion of the particular vector object and the portion of the additional vector object within a combined region (e.g., back to the visual order or to a different modified visual order).

In a second example, the user generates the interaction data as describing an additional region that partially overlaps the region such that a first portion of the additional region includes the portion of the particular vector object and the portion of the additional vector object and a second portion of the additional region includes a portion of a third vector object in addition to the portion of the particular vector object and the portion of the additional vector object. In this second example, the order system receives and processes the interaction data to split the additional region into a first region corresponding to the first portion of the additional region and second region corresponding to the second portion of the additional region. For example, the order system generates the first and second regions such that they do not overlap and include portions of vector objects ordered in a single visual order.

Returning to the example in which the order system generates the group of vector objects having the modified visual order within the region, the order system also leverages an offscreen render surface for rendering the group of vector objects having the modified visual order within the region. To do so in one example, the order system identifies a z-order of nodes included in an input render tree that correspond to vector objects included in the group of vector objects which is described by the input data. The order system generates the offscreen render surface and sets the offscreen render surface as a current framebuffer.

For example, the order system rasterizes the region into the offscreen render surface and marks pixels within the region with a sentinel value. Continuing this example, the order system sets an original framebuffer as the current framebuffer and draws the group of vector objects according to the z-order of the input render tree by identifying pixels that are not marked with the sentinel value. The order system then draws the portion of the particular vector object and the portion of the additional vector object within the region according to the modified visual order by identifying pixels that are marked with the sentinel value. Finally, the order system clears the offscreen render surface, e.g., in order to render another group of vector objects using both the z-order of the input render tree and visual orders of portions of vector objects within regions.

In addition to providing the functionality capable of visual reordering of partial vector objects in a free-form manner via the user's interaction with the input device, the described systems also efficiently represent portions of vector objects within regions as well as portions of the vector objects that are excluded from the regions. The described systems are capable of processing cyclic dependencies among vector objects within groups of vector objects and are also capable of use in related applications such as hit testing. Additionally, the described systems modify visual orders of portions of vector objects in a manner that is non-destructive to geometries of the vector objects which is not possible using conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For example, the display device 106 is an ultra-high-definition display device having a display resolution of 4K, 5K, 8K, etc. The computing device 102 includes a storage device 108 and an order module 110. The storage device 108 is illustrated to include digital content 112 such as digital images, digital artwork, digital videos, etc.

The computing device 102 and/or the order module 110 have access to a graphics processing unit (GPU) 114 which is representative of multiple GPUs 114 in some examples. In one example, the computing device 102 includes the GPU 114 in addition to a central processing unit (CPU). In another example, the GPU 114 is available to the computing device 102 and the order module 110 via the network 104. For example, the computing device 102 and the order module 110 leverage the GPU 114 (e.g., GPU 114 computing kernels) for processing and rendering digital content 112 and/or for processing data in series or parallel with the CPU such as in a CPU-GPU 114 framework. In an example, this includes leveraging multiple CPUs and/or multiple GPUs 114.

As shown, the order module 110 is illustrated as having, receiving, and/or transmitting input data 116 describing a group of vector objects 118. For instance, the group of vector objects 118 includes a first vector object 120, a particular vector object 122, and a second vector object 124. The first vector object 120 is a glyph depicting an "H;" the particular vector object 122 is a glyph depicting a "D;" and the second vector object 124 is a glyph depicting a "K."

The input data 116 also describes a first region 126 having a square geometry that includes a portion of the first vector object 120 and a first portion of the particular vector object 122 as well as a second region 128 having a circular geometry that includes a portion of the second vector object 124 and a second portion of the particular vector object 122. As shown, the portion of the first vector object 120 is ordered before or above the first portion of the particular vector object 122 (or the first portion of the particular vector object 122 is ordered after or below the portion of the first vector object 120) in a visual order of the first region 126. The portion of the second vector object 124 is ordered after or below the second portion of the particular vector object 122 (or the second portion of the particular vector object 122 is ordered before or above the portion of the second vector object 124) in a visual order of the second region 128.

As illustrated in the environment 100, the first vector object 120 is ordered before or above the particular vector object 122 outside of the first region 126 in the group of vector objects 118. Similarly, the particular vector object 122 is ordered before or above the second vector object 122 outside of the second region 128 in the group of vector objects 118. For example, the first region 126 and the second region 128 are mutually exclusive and the first and second regions 126, 128 do not overlap. In this example, a visual order of portions of vector objects included in the first region 126 is consistent within the first region 126. Similarity, a visual order of portions of vector objects included in the second region 128 is consistent within the second region 128. For instance, the order module 110 leverages the properties of mutual exclusivity of regions or zones and consistency of a visual order of partial vector objects included in the regions or zones to compute modified visual orders of the partial vector objects included in the regions or zones automatically and without user intervention in some scenarios.

The order module 110 is illustrated as having, receiving, and/or transmitting interaction data 130. For instance, a user interacts with an input device (e.g., a mouse, a stylus, a touchscreen, a keyboard, etc.) relative to a user interface such as a user interface 132 of the display device 106 to generate the interaction data 130. In an example, the user interacts with the input device relative to a user interface displaying the group of vector objects 118 to specify the first region 126 by drawing the first region 126 relative to the particular vector object 122 to include the portion of the first vector object 120 and the first portion of the particular vector object 122. In this example, the user also interacts with the input device relative to the user interface displaying the group of vector objects 118 to specify the second region 128 by drawing the second region 128 relative to the particular vector object 122 to include the portion of the second vector object 124 and the second portion of the particular vector object 122.

For example, the order module 110 receives and processes the input data 116 and the interaction data 130 to modify a visual order of the portion of the first vector object 120 and the first portion of the particular vector object 122 within the first region 126 and to modify a visual order of the second portion of the particular vector object 122 and the portion of the second vector object 124 within the second region 128. To do so in one example, the order module 110 determines the visual order of portions of vector objects included in the group of vector objects 118 within the first region 126. Accordingly, the order module 110 determines that the portion of the first vector object 120 is ordered before or above the first portion of the particular vector object 122 in the visual order of the first region 126.

In some examples, the user interacts with the input device relative to the user interface displaying the group of vector objects 118 to generate the interaction data 130 as describing an operation for modifying the visual order of the first region 126. In other examples, the order module 110 processes the input data 116 to determine that the first vector object 120 is a topmost vector object within the first region 126 and that the particular vector object 122 is a bottommost vector object within the first region 126. In these other examples, it is not necessary for the user to specify the operation for modifying the visual order of the first region 126 because first vector object 120 is the topmost vector object within the first region 126, the particular vector object 122 is the bottom most vector object within the first region 126, and no other portions of vector objects included in the group of vector objects 118 are disposed within the first region 126.

Accordingly, the order module 110 determines that the first portion of the particular vector object 122 is ordered before or above the portion of the first vector object 120 in a modified visual order for the first region 126. In a similar example, the order module 110 processes the input data 116 to determine that the particular vector object 122 is a topmost vector object within the second region 128 and that the second vector object 124 is a bottommost vector object within the second region 128. For instance, the order module 110 determines that no other portions of vector objects included in the group of vector objects 118 are disposed within the second region 128. Based on this, the order module 110 determines that the portion of the second vector object 124 is ordered before or above the second portion of the particular vector object 122 in a modified visual order for the second region 128. The order module 110 generates a modified group of vector objects 134 having the modified visual order within the first region 126 as a modified first region 136 and having the modified visual order within the second region 128 as a modified second region 138 which is displayed in the user interface 132 of the display device 106.

In order to render the modified group of vector objects 134 for display in the user interface 132, the order module 110 draws portions of the first vector object 120 and the particular vector object 122 that are excluded from the first region 126 in a z-order of nodes included in an input render tree that correspond to the first vector object 120 and the particular vector object 122. However, the order module 110 also draws the portion of the first vector object 120 and the first portion of the particular vector object 122 in the modified visual order for the first region 126 as the modified first region 136. Similarly, the order module 110 draws portions of the second vector object 124 and the particular vector object 122 that are excluded from the second region 128 in a z-order of nodes included in the input render tree that correspond to the second vector object 124 and the particular vector object 122. The order module 110 also draws the portion of the second vector object 124 and the second portion of the particular vector object 122 in the modified visual order for the second region 128 as the modified second region 138.

To do so in one example, the order module 110 generates an offscreen render surface and sets it as a current framebuffer. In this example, the order module 110 rasterizes the first region 126 and the second region 128 into the offscreen render surface and marks pixels in the first and second regions 126, 128 with a sentinel value such as 0xFF. The order module 110 sets an original framebuffer as the current framebuffer, and then draws the group of vector objects 118 (e.g., but not the first and second regions 126, 128) based on the z-order of the nodes included in the input render tree. For instance, the order module 110 identifies the group of vector objects 118 based on pixels that are not marked with the sentinel value. In this manner, the order module 110 generates and renders portions of the first vector object 120, the particular vector object 122, and the second vector object 124 in the modified group of vector objects 134 that are excluded from the modified first region 136 and the modified second region 138.

Next, the order module 110 draws the first region 126 in the modified visual order for the first region 126 based on the pixels that are marked with the sentinel value in the first region 126. For instance, the order module 110 draws the modified first region 136 based on the pixels that are marked with the sentinel value in the first region 126. Similarly, the order module 110 draws the second region 128 in the modified visual order for the second region 128 based on the pixels that are marked with the sentinel value in the second region 128. Accordingly, the order module 110 draws the modified second region 138 based on the pixels that are marked with the sentinel value in the second region 128. The order module 110 then clears the offscreen render surface.

As shown in the modified group of vector objects 134, the first portion of the particular vector object 122 is disposed before or above the portion of the first vector object 120 in the modified first region 136. The portion of the second vector object 124 is disposed before or above the second portion of the particular vector object 122 in the modified second region 138. For example, the order module 110 generates and displays the modified group of vector objects 134 in a manner which preserves a geometry of the first vector object 120, the particular vector object 122, and the second vector object 124.

The order module 110 is also capable of generating the modified group of vector objects 134 in scenarios in which the first and second vector objects 120, 124 include complex visual appearances such as blends and transparencies. This is not possible in conventional systems that are limited to local layering and other techniques which are not capable of preserving the geometry of the first vector object 120, the particular vector object 122, and the second vector object 124. Conventional systems are also not capable of facilitating visual reordering of partial vector objects in a free-form manner in which portions of vector objects are reordered automatically. For instance, when the order module 110 receives the interaction data 130 describing a user specified region without additional specifications for reordering portions of vector objects within the user specified region, the order module 110 moves a topmost portion of a vector object down within the user specified region and the order module 110 moves an intermediate portion of a vector object up within the user specified region automatically. For example, the order module 110 is capable of receiving the interaction data 130 as describing a deletion of the first region 126 (or the modified first region 136) or the second region 128 (or the modified second region 138). In some examples, the order module 110 receives the interaction data 130 as describing an addition of a third region to the group of vector objects 118 which is described in detail with respect to FIG. 4 below.

Figure 2:
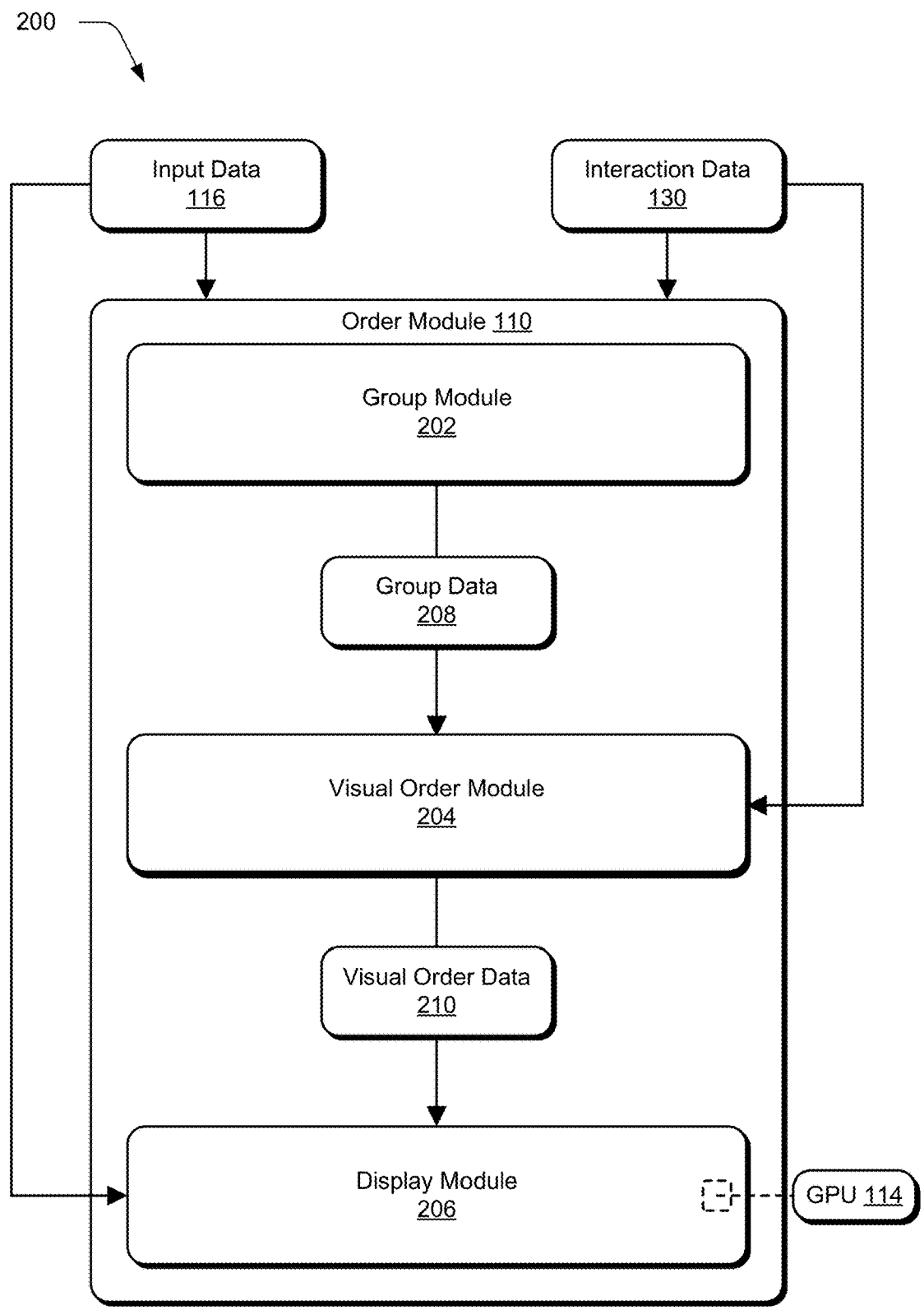
FIG. 2 depicts a system in an example implementation showing operation of an order module for visual reordering of partial vector objects.

FIG. 2 depicts a system 200 in an example implementation showing operation of an order module 110. The order module 110 is illustrated to include a group module 202, a visual order module 204, and a display module 206. For example, the group module 202 receives and processes the input data 116 and/or the interaction data 130 to generate group data 208. In some examples, the input data 116 describes a group of vector objects displayed in a user interface of an application for editing digital content. In these examples, a user interacts with an input device (e.g., a stylus, a mouse, a touchscreen, a microphone, a keyboard, etc.) relative to the user interface of the application for editing digital content to generate the interaction data 130. For instance, the user interacts with the input device relative to the user interface to generate the interaction data 130 as describing a selection of the group of vector objects described by the input data 116 as an intertwine group for visual reordering of partial vector objects, a selection of a subset of the group of vector objects described by the input data 116 as the intertwine group for visual reordering of partial vector objects, specification of a vector object included in the intertwine group as a particular or key vector object, specification of a region that includes a portion of the particular or key vector object and a portion of an additional vector object included in the intertwine group, an operation to modify a visual order of the portion of the particular or key vector object and the portion of the additional vector object within the region, and so forth.

Figure 3:
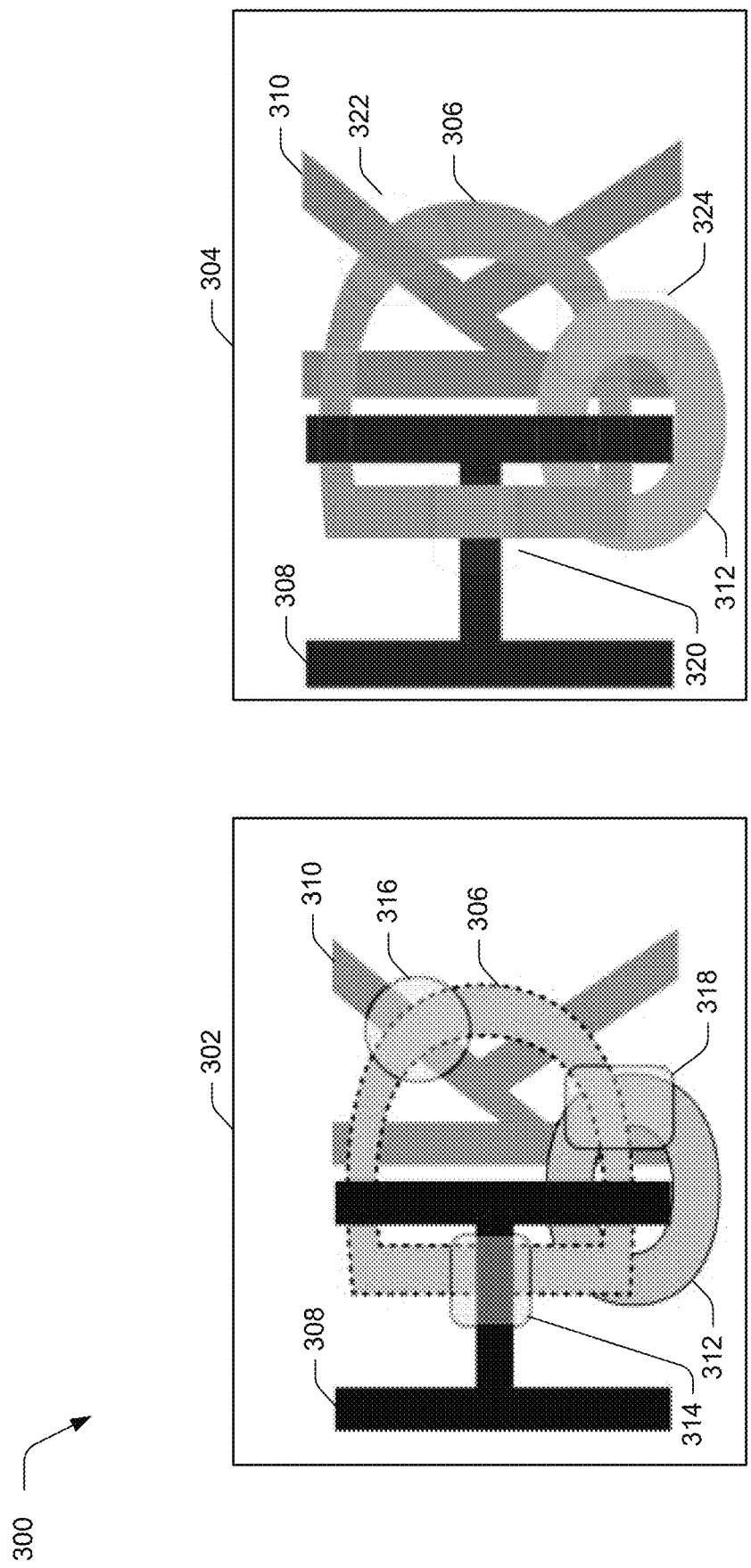
FIG. 3 illustrates a representation of regions specified relative to a particular vector object included in a group of vector objects and visual reordering of partial vector objects included in the regions.

FIG. 3 illustrates a representation 300 of regions specified relative to a particular vector object included in a group of vector objects and visual reordering of partial vector objects included in the regions. As shown, the representation 300 includes a group of vector objects 302 and a modified group of vector objects 304. In one example, the group module 202 receives the input data 116 as describing the group of vector objects 302. In this example, the group of vector objects 302 is displayed in the user interface (e.g., the user interface 132) of the application for editing digital content. The user interacts with the input device relative to the user interface to generate the interaction data 130 as describing a specification of a particular or key vector object 306 that is included in the group of vector objects 302.

As illustrated in FIG. 3, the particular or key vector object 306 is a glyph depicting a "D." For instance, the group of vector objects 302 also includes a first vector object 308 which is a glyph depicting an "H;" a second vector object 310 which is a glyph depicting a "K;" and a third vector object 312 which is a glyph depicting an "O." In one example, the group module 202 receives and processes the input data 116 and the interaction data 130 to generate the group data 208 as describing the particular or key vector object 306 as well as the first, second, and third vector objects 308, 310, 312.

In this example, the visual order module 204 receives and processes the group data 208 and/or the interaction data 130 to generate visual order data 210. For example, the visual order module 204 receives and processes the interaction data 130 as describing a first region 314, a second region 316, and a third region 318, and the visual order module 204 generates the visual order data 210 as describing the first, second, and third regions 314, 316, 318. Continuing the previous example, the display module 206 receives and processes the visual order data 210 to render the modified group of vector objects 304 in the user interface 132.

Consider another example in which the visual order module 204 receives the group data 208 as describing the group of vector objects 302 and the visual order module 204 receives the interaction data 130 describing the first region 314. In this example, the first region 314 includes a portion of the first vector object 308 and a first portion of the particular or key vector object 306. As shown, the portion of the first vector object 308 is ordered before or above the first portion of the particular or key vector object 306 in a visual order of the first region 314. For instance, the visual order module 204 denotes the visual order of the first region 314 as H, D where H represents the portion of the first vector object 308 and D represents the first portion of the particular or key vector object 306. In an example, the visual order module 204 is capable of representing visual orders as a total order which is representable as:

$$V_{toset} = (x_1, x_2, \ldots, x_N) \rightarrow V = (A_{x_1}, A_{x_2}, \ldots, A_{x_i} \ldots A_{x_N})$$

where: $V_{toset}$ represents a list of all art object identifiers (e.g., by index or global unique identifier); and N represents a total number of the art objects.

For example, the visual order module 204 is also capable of representing visual orders as a partial order which is representable as:

$$V_{poset} = (x_1, x_2, \ldots, x_k) \rightarrow V = (A_{x_1}, A_{x_2}, \ldots, A_{x_i} \ldots A_{x_k})$$

where: $V_{poset}$ represents a list of all art object identifiers in a region such as the first region 314; and k≤; N.

Continuing the previous example, the visual order module 204 receives the interaction data 130 describing the first region 314, the second region 316, and the third region 318. The second region 316 includes a second portion of the particular or key vector object 306 and a first portion of the second vector object 310. As illustrated in the representation 300, the second portion of the particular or key vector object 306 is ordered before or above the first portion of the second vector object 310 in a visual order of the second region 316. The visual order module 204 denotes the visual order of the second region 316 as D, K where D represents the second portion of the particular or key vector object 306 and K represents the first portion of the second vector object 310.

The third region 318 includes a third portion of the particular or key vector object 306, a portion of the third vector object 312, and a second portion of the second vector object 310. For instance, the third portion of the particular or key vector object 306 is ordered before or above the portion of the third vector object 312 and the second portion of the second vector object 310; the portion of the third vector object 312 is ordered after or below the third portion of the particular or key vector object 306 and before or above the second portion of the second vector object 310; and the second portion of the second vector object 310 is ordered after or below the third portion of the particular or key vector object 306 and the portion of the third vector object 312 in a visual order of the third region 318. In one example, the visual order module 204 denotes the visual order of the third region 318 as D, 0, K where D represents the third portion of the particular or key vector object 306, 0 represents the portion of the third vector object 312, and K represents the second portion of the second vector object 310.

Consider an example in which the user interacts with the input device relative to the user interface of the application for editing digital content to generate the interaction data 130 as describing an operation for changing a visual order of portions of vector objects included in the group of vector objects 302 that are within the first region 314, the second region 316, and/or the third region 318. In this example, the user interacts with the input device to specify the operation relative to the particular or key vector object 306. However, in other examples, the operation is specified relative to another vector object included in the group of vector objects 302 such as the first vector object 308, the second vector object 310, the third vector object 312, etc.

For example, the interaction data 130 describes the operation with respect to an operator ⊕ as being "send back," "send front," "send backward," or "send forward." The operator ⊕ is unary, binary, or ternary which is representable as:

Ternary [V⊕($A_{key}$, $A_i$, D)]
Binary [V⊕($A_{key}$, D)]
Unary [V⊕$A_{key}$]

where: $A_{key}$ represents the particular or key vector object 306; and a visual order V of $A_{key}$ is changed in a direction guided by parameter D with reference to vector object $A_i$ which is the first vector object 308, the second vector object 310, or the third vector object 312.

In an example, a ternary operation ⊕ is a most explicit manner of changing a visual order V of portions of vector objects within a region Z. As shown in the example above, is not necessary for the user to specify a reference vector object $A_i$ for a binary operation ⊕ as the reference vector object is determined automatically based on a current visual order $V_{old}$ within the region Z. Similarly, it is not necessary for the user to specify a reference vector object $A_i$ or a direction parameter D for a unary operation ⊕. This is because $A_{key}$ is a topmost vector object in V, and D is automatically determined to be "send backward" or $A_{key}$ is a bottommost vector object in V, and D is automatically determined to be "send forward" for a unary operation ⊕.

For a visual order V within the first region 314, the second region 316, and/or the third region 318, the visual order module 204 is capable of determining a modified visual order $V_{new}$ in a manner which is representable as:

procedure GetNewVisualOrder(V, $A_{key}$, $A_i$, D)
$V_{new} \leftarrow V$
$i_{src} \leftarrow$ Find index of $A_{key}$ in V
$i_{dst} \leftarrow$ Find index of $A_i$ in V
if $i_{src}$ and $i_{dst}$ are defined then
if SIGN($i_{src} - i_{dst}$, D)==0 then
move $A_{key}$ at $i_{dst}$ in $V_{new}$
return $V_{new}$ For example, the visual order module 204 determines a new visual order $V_{new}$ for a modified first region 320 based on the visual order V of the first region 314; the visual order module 204 determines a new visual order $V_{new}$ for a modified second region 322 based on the visual order V of the second region 316; and the visual order module 204 determines a new visual order $V_{new}$ for a modified third region 324 based on the visual order V of the third region 318. For the first region 314 having the visual order V denoted H, D, the visual order module 204 performs a unary operation ⊕ because the particular or key vector object 306 is a bottommost vector object in the first region 314. The visual order module 204 orders the first portion of the particular or key vector object 306 before or above the portion of the first vector object 308 in the modified first region 320. In one example, the visual order module 204 denotes the new visual order $V_{new}$ for the modified first region 320 as D, H.

For the second region 316 having the visual order V denoted D, K, the visual order module 204 performs a unary operation ⊕ because the particular or key vector object 306 is a topmost vector object in the second region 316. The visual order module 204 orders the second portion of the particular or key vector object 306 after or below the first portion of the second vector object 310 in the modified second region 322. For instance, the visual order module 204 denotes the new visual order $V_{new}$ for the modified second region 322 as K, D.

For the third region 318 having the visual order V denoted D, O, K, the visual order module 204 performs a ternary operation ⊕ that includes a direction D specified by the user interacting with the input device and described by the interaction data 130. In an example, the visual order module 204 orders the third portion of the particular or key vector object 306 after or below the portion of the third vector object 312 and also orders the third portion of the particular or key vector object 306 before or above the second portion of the second vector object 310. In this example, the visual order module 204 denotes the new visual order $V_{new}$ for the modified third region 324 as O, D, K.

Figure 4:
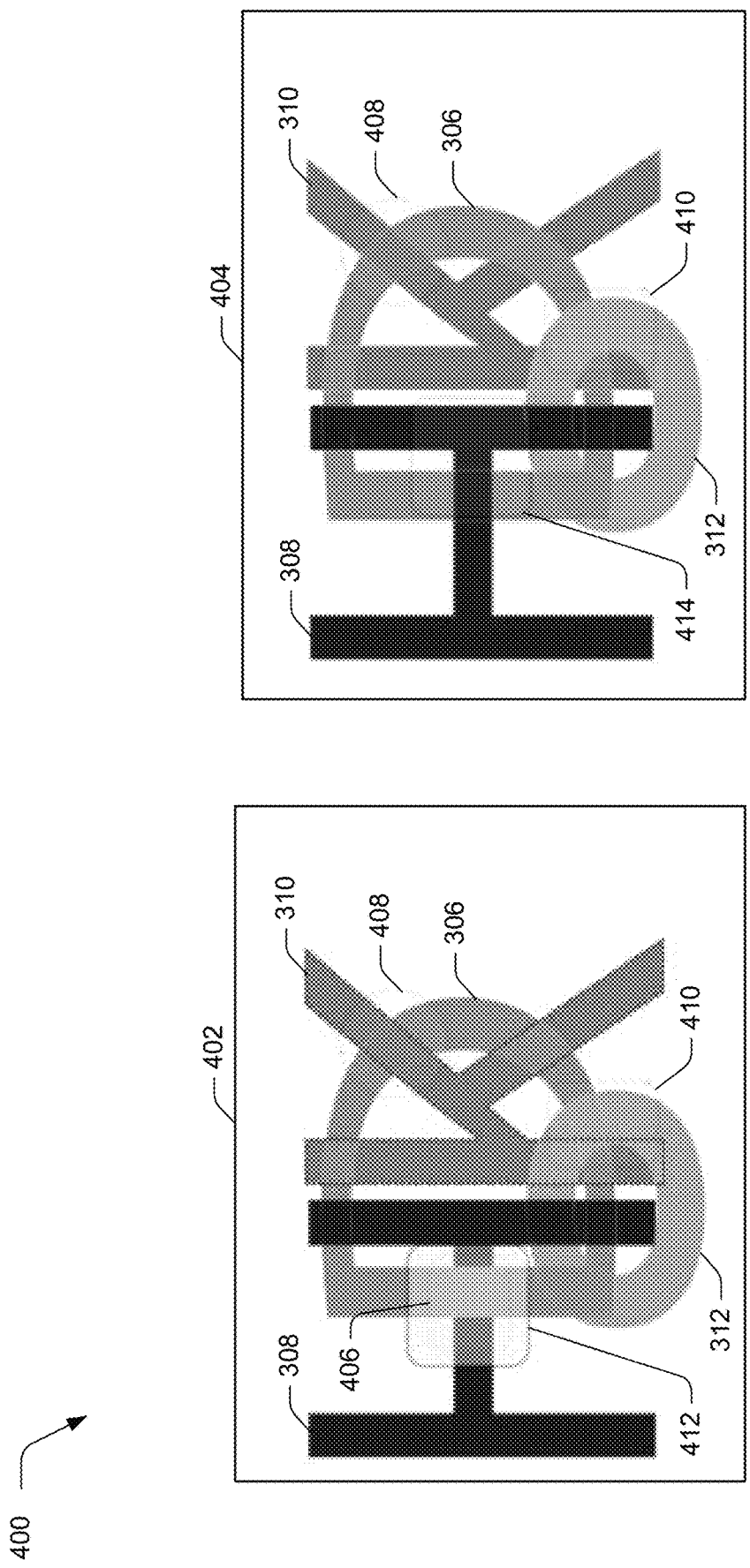
FIG. 4 illustrates a representation of specifying an additional region relative to a particular vector object included in a group of vector objects that fully overlaps an existing region of an intertwine group.

For example, the visual order module 204 generates the visual order data 210 as describing the new visual order $V_{new}$ for the modified first region 320, the new visual order $V_{new}$ for the modified second region 322, and the new visual order $V_{new}$ for the modified third region 324. The display module 206 receives and processes the visual order data 210 to generate the modified group of vector objects 304 for display in the user interface 132. FIG. 4 illustrates a representation 400 of specifying an additional region relative to a particular vector object included in a group of vector objects that fully overlaps an existing region of an intertwine group.

As shown, the representation 400 includes a group of vector objects 402 and a modified group of vector objects 404. For example, the group of vector objects 402 includes the particular or key vector object 306, the first vector object 308, the second vector object 312, and the third vector object 312. The group of vector objects 402 also includes a first region 406, a second region 408, and a third region 410. The first region 406 includes a first portion of the particular or key vector object 306 and a portion of the first vector object 308. For example, the first portion of the particular or key vector object 306 is ordered before or above the portion of the first vector object 308 and the visual order module 204 denotes a visual order V of the first region 406 as D, H.

The second region 408 includes a first portion of the second vector object 310 and a second portion of the particular or key vector object 306 such that the first portion of the second vector object 310 is ordered before or above the second portion of the particular or key vector object 306 in the second region 408. In one example, the visual order module 204 denotes a visual order V of the second region 408 as K, D. The third region 410 includes a third portion of the particular or key vector object 306, a second portion of the second vector object 310, and a first portion of the third vector object 312. For instance, the first portion of the third vector object 312 is ordered before or above the third portion of the particular or key vector object 306 and the second portion of the second vector object 310. The third portion of the particular or key vector object 306 is ordered after or below the first portion of the third vector object 312 and before or above the second portion of the second vector object 310. For example, the visual order module 204 denotes a visual order V of the third region 410 as O, D, K.

In the representation 400, the first region 406, the second region 408, and the third region 410 are mutually exclusive (e.g., do not overlap) and have unique or consistent visual orders Vs which is representable as:

$$Z=(\Omega,V)|\Omega_i \cap \Omega_j=\emptyset,|V|=1$$

where: region or zone (Z) is a closed Bezier based boundary (Ω) which contains a visual order (V) of portions of vector objects within the region or zone (Z).

Consider an example in which the user manipulates the input device relative to the user interface of the application for editing digital content to specify an additional region or zone 412 that fully contains or fully overlaps the first region 406. In this example, the visual order module 204 receives and processes the interaction data 130 describing the additional region or zone 412 to determine a visual order V of the additional region or zone 412 based on the visual order V of the first region 406 which is D, H. For example, before determining the visual order V of the additional region or zone 412, the visual order module 204 determines how to add the additional region or zone 412 to the group of vector objects 402. In an example, this is representable as:

procedure GetNewZones(Σ, (n, $A_{key}$, $A_i$, D))
$\Sigma_{new} \leftarrow \emptyset$
for each $Z_i$ in Σ do
if $\Omega_i \cap \Omega == \emptyset$ then
$\Omega_{old} \leftarrow \Omega_i-\Omega$, $\Omega_{com} \leftarrow \Omega_i \cap \Omega$ compute intersection surface
$\Omega \leftarrow \Omega-\Omega_i$ compute remaining input region
$Z_{old} \leftarrow (\Omega_{old}, V_i)$ compute modified older region without any change in visual order
$Z_{com} \leftarrow (\Omega_{com}, V_i \oplus (A_{key}, A_i, D))$ compute visual order
$\Sigma \leftarrow \Sigma-Z_i$ remove $Z_i$ from Σ
$\Sigma_{new} \leftarrow \Sigma_{new}+Z_{com}+Z_{old}$ add ($Z_{com}$, $Z_{old}$) in $\Sigma_{new}$
merge zones in $\Sigma_{new}$ merge newer zones with older zones based on same visual order V
$\Sigma_{new} \leftarrow \Sigma_{new}+\Sigma$
return $\Sigma_{new}$ where: Σ denotes a set of zones or regions Z in a group of vector objects designated as an intertwine group.

Continuing the previous example, the visual order module 204 determines that for adding any particular zone or region to a group of vector objects designated as an intertwine group, there is a default or implicit zone Z in the intertwine group defined by a bounding box of the intertwine group that has a visual order V defined in the user interface of the application for editing digital content (e.g., in a layers panel of the user interface). Accordingly, adding the particular zone to the intertwine group either overlaps one existing zone of the intertwine group such as the default or implicit zone Ω or the particular zone overlaps multiple existing zones of the intertwine group. Further, deleting an existing zone or region is a special case of adding the particular zone to the default or implicit zone Z.

In the representation 400, the additional region or zone 412 overlaps a single existing region (the first region 406). Accordingly, the visual order module 204 merges the additional region or zone 412 with the first region 406 such that the additional region or zone 412 has a same visual order V of the first region 406 which is D, H. For example, the visual order module 204 determines a new visual order $V_{new}$ for a modified additional region or zone 414 included in the modified group of vector objects 404 based on the visual order V of the additional region or zone 412. In this example, the visual order module 204 determines that the first portion of the first vector object 308 is ordered before or above the first portion of the particular or key vector object 306 in the new visual order $V_{new}$ for the modified additional region or zone 414. In an example, the visual order module 204 denotes the new visual order $V_{new}$ for the modified additional region or zone 414 as H, D and generates the visual order data 210 as describing the new visual order $V_{new}$ for the modified additional region or zone 414.

Figure 5A:
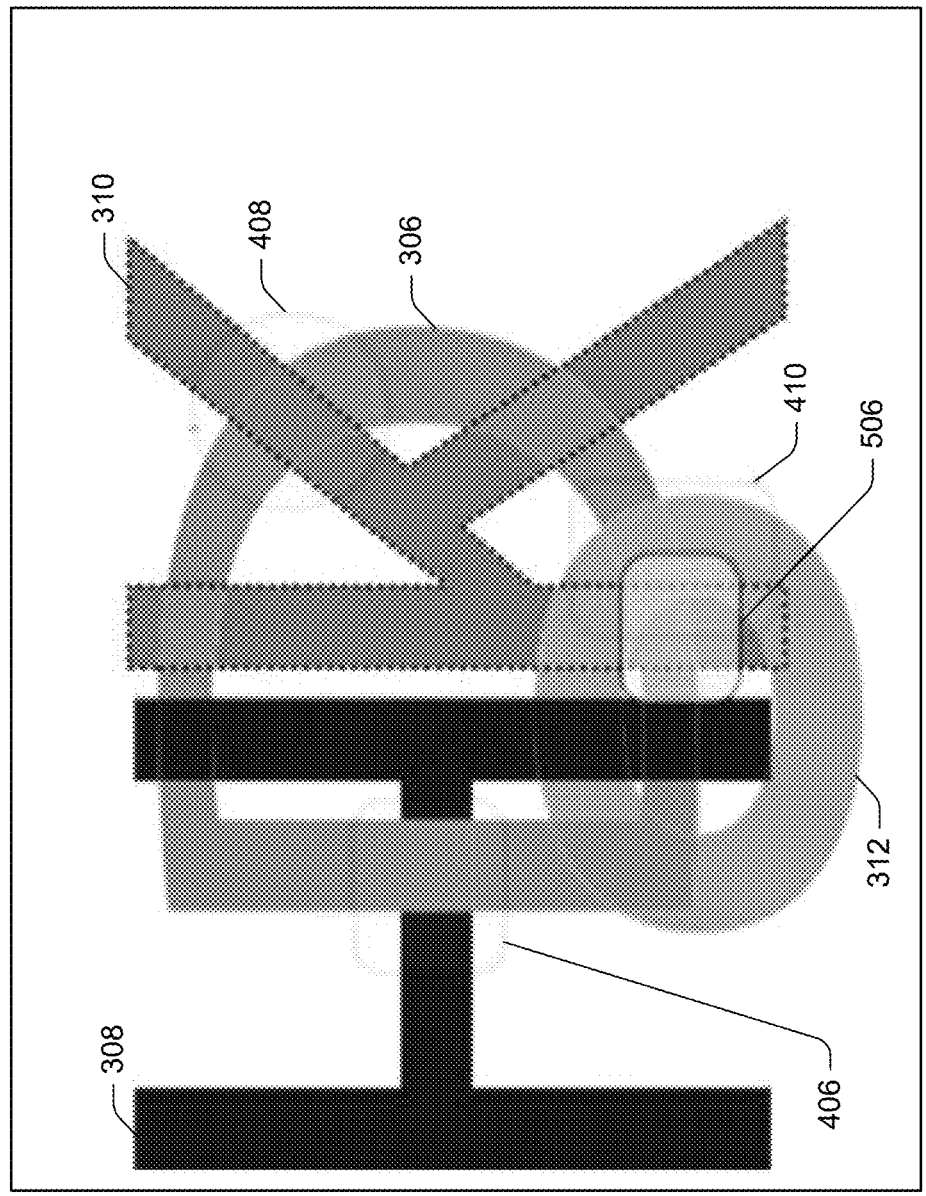
FIGS. 5A, 5B, and 5C illustrate a representation of specifying an additional region relative to a particular vector object included in a group of vector objects that partially overlaps an existing region of an intertwine group.
Figure 5B:
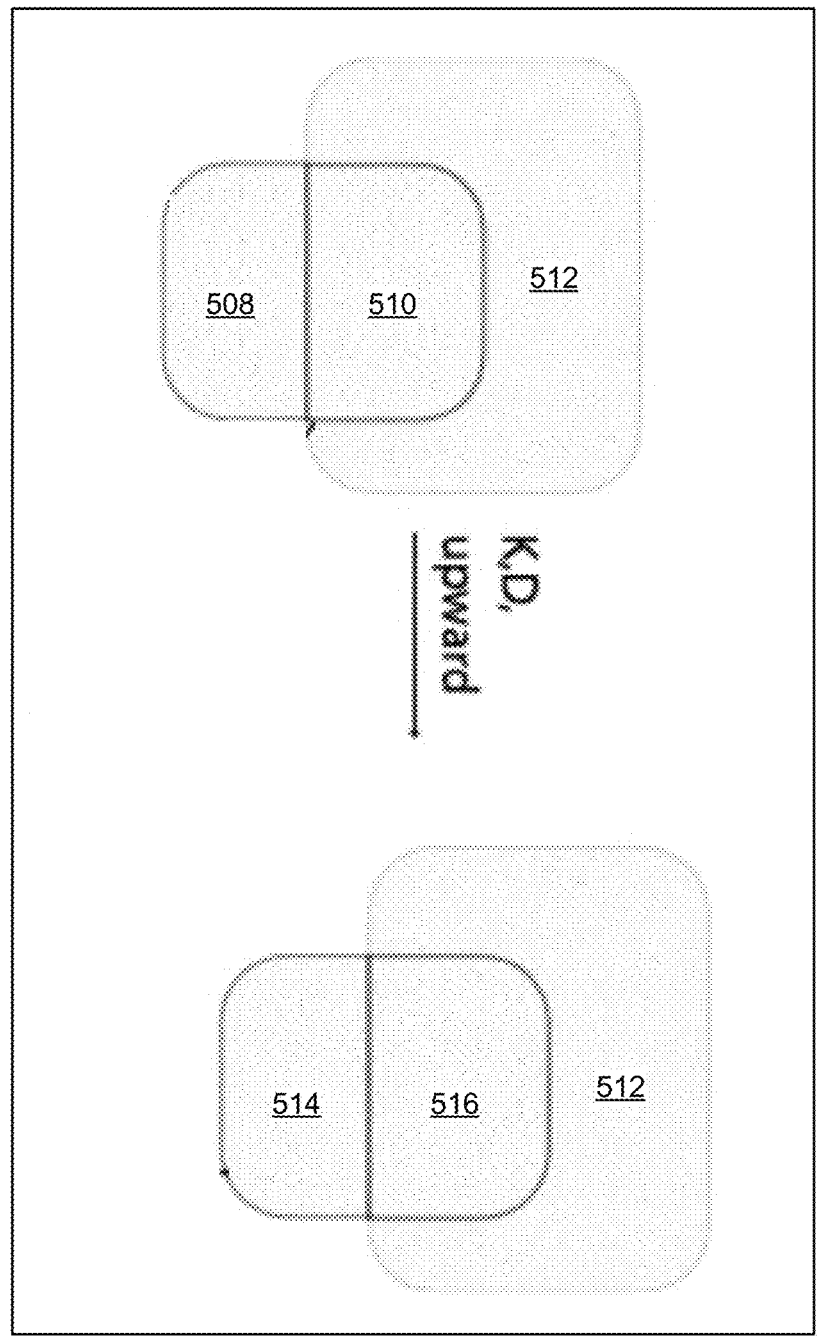
Figure 5C:
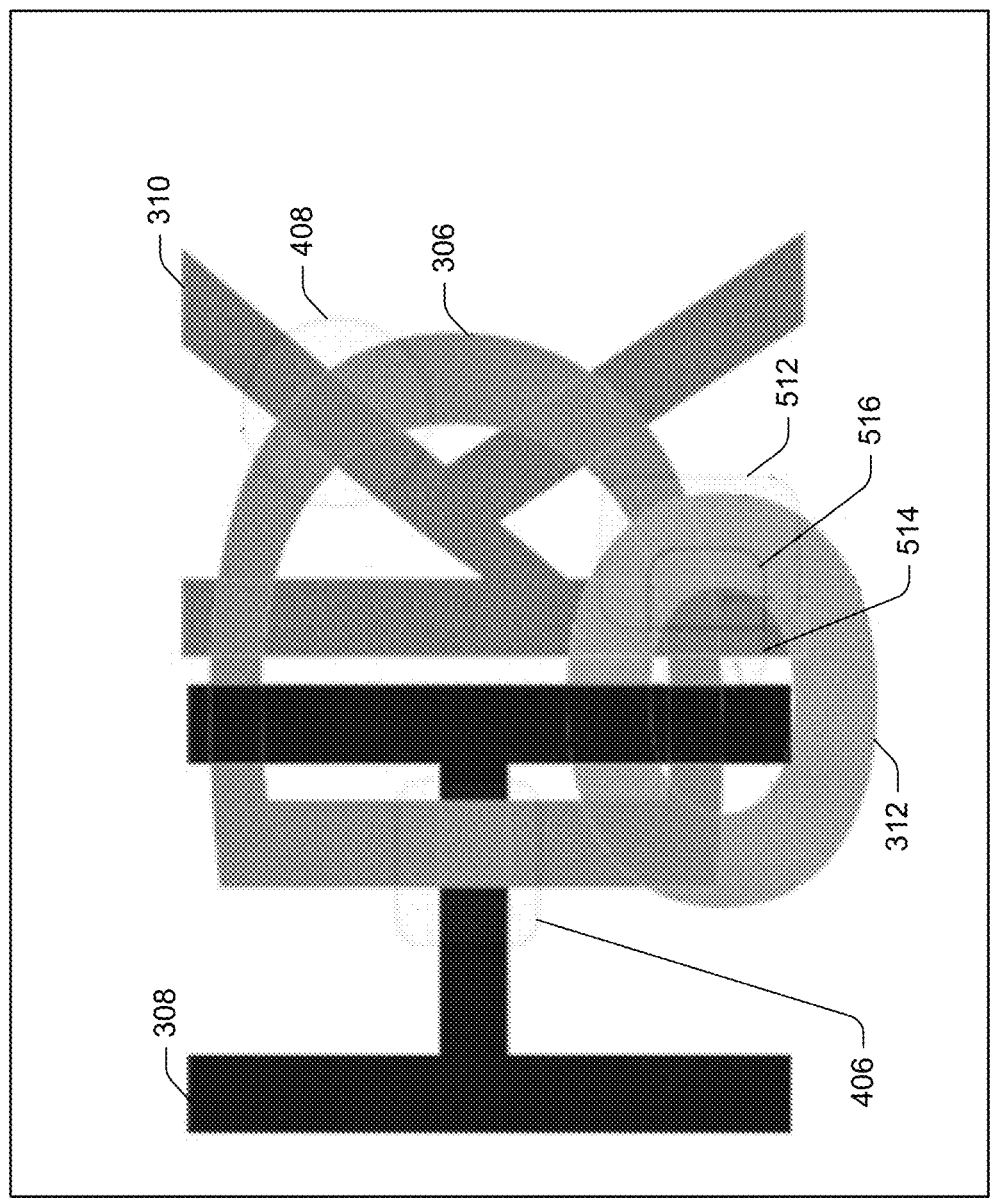

FIGS. 5A, 5B, and 5C illustrate a representation of specifying an additional region relative to a particular vector object included in a group of vector objects that partially overlaps an existing region of an intertwine group. FIG. 5A illustrates a representation 500 of the additional zone or region that partially overlaps the existing zone or region of the intertwine group. FIG. 5B illustrates a representation 502 of splitting the existing zone or region into multiple zones or regions based on the additional zone or region. FIG. 5C illustrates a representation 504 of new visual orders determined for the multiple zones or regions.

As shown in the representation 500, the intertwine group of vector objects includes the first region 406, the second region 408, and the third region 410. The user interacts with the input device relative to the user interface of the application for editing digital content to generate the interaction data 130 as describing an additional region 506 that partially overlaps the third region 410. For example, the visual order module 204 receives and processes the interaction data 130 to add the additional region 506 to the intertwine group of vector objects.

With reference to FIG. 5B, the visual order module 204 splits the third region 410 and the additional region 506 into a fourth region 508, a fifth region 510, and a sixth region 512. For instance, the visual order module 204 denotes a visual order V of the fourth region 508 as D, O, K; a visual order V of the fifth region 510 as O, D, K; and a visual order V of the sixth region 512 as O, D, K. However, this causes the fifth region 510 and the sixth region 512 to have a same visual order V of O, D, K. Because of this, the visual order module 204 determines a modified fourth region 514 and a modified fifth region 516 by moving portions of the second vector object 310 denoted as K upward in the fourth region 508 and the fifth region 510.

Accordingly, the visual order module 204 denotes a new visual order $V_{new}$ for the modified fourth region 514 as K, D, 0 and the visual order module 204 denotes a new visual order $V_{new}$ for the modified fifth region 516 as O, K, D. The modified fourth region 514, the modified fifth region 516, and the sixth region 512 have unique or consistent visual orders and are not overlapping. For example, the visual order module 204 generates the visual order data 210 as describing the modified fourth region 514, the modified fifth region 516, and the sixth region 512.

The display module 206 receives and processes the visual order data 210 to generate and display the intertwine group in the representation 504 as having the modified fourth region 514, the modified fifth region 516, and the sixth region 512 in place of the third region 410 and the additional region 506 of the intertwine group in the representation 500. To do so in one example, the display module 206 receives and processes the input data 116 to determine a z-order of an input render tree having nodes corresponding to the vector objects 308-312. As shown in FIG. 2, the display module 206 is illustrated as having access to the GPU 114 and the display module 206 leverages the GPU 114, the z-order of the input render tree, and the visual order data 210 to render the intertwine group as having the modified fourth region 514, the modified fifth region 516, and the sixth region 512.

Figure 6:
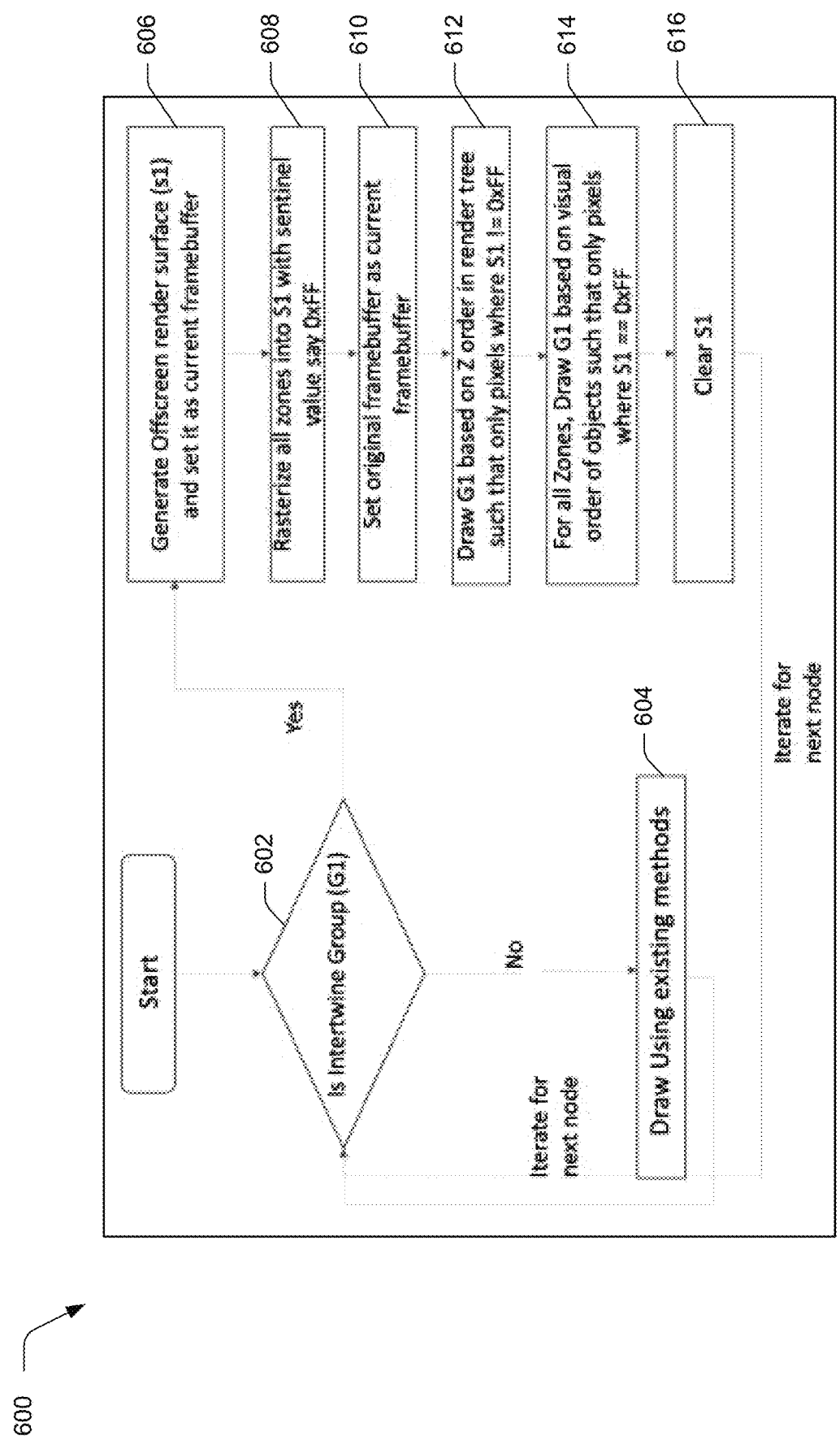
FIG. 6 illustrates a representation of rendering partial vector objects in a visual order.

FIG. 6 illustrates a representation 600 of rendering partial vector objects in a visual order. For example, the display module 206 receives and processes the input data 116. At 602, the display module 206 determines whether or not the input data 116 describes a group of vector objects specified as an intertwine group. If the display module 206 determines that the input data 116 does not describe an intertwine group, then the display module 206 renders vector objects described by the input data 116 using existing rendering methods at 604. For example, at 604, the display module 206 renders all portions of the group of vector objects according to the z-order of the input render tree.

If the display module 206 determines that the input data 116 describes an intertwine group, then the display module 206 generates an offscreen render surface and sets the offscreen render surface as a current framebuffer at 606. At 608, the display module 206 processes the visual order data 210 to rasterize all regions or zones of the intertwine group into the offscreen render surface and marks pixels of the regions or zones with a sentinel value such as 0xFF in a mask buffer. For example, the display module 206 marks pixels within the first region 406, the second region 408, the modified fourth region 514, the modified fifth region 516, and the sixth region 512 with the sentinel value in the mask buffer. At 610, an original framebuffer is set as the current framebuffer.

At 612, the display module 206 draws portions (e.g., pixels) of the intertwine group that are not marked with the sentinel value according to the z-order of the input render tree. For instance, the display module 206 renders portions of the particular or key vector object 306 that are not included in the first region 406, the second region 408, the modified fourth region 514, the modified fifth region 516, or the sixth region 512 at 612. Similarly, the display module 206 renders portions of the first vector object 308 that are not included in the first region 406; the display module 206 renders portions of the second vector object 310 that are not included in the second region 408, the modified fourth region 514, the modified fifth region 516, or the sixth region 512; and the display module 206 renders portions of the third vector object 312 that are not included in the modified fourth region 514, the modified fifth region 516, or the sixth region 512 at 612.

At 614, the display module 206 draws portions (e.g., pixels) of the intertwine group that are marked with the sentinel value according to the visual orders described by the visual order data 210. For example, the display module 206 renders a portion of the particular or key vector object 306 and a portion of the first vector object 308 included in the first region 406 in the visual order denoted D, H. In this example, the display module 206 renders a portion of the particular or key vector object 306 and a portion of the second vector object 310 included in the second region 410 in the visual order denoted K, D; the display module 206 renders a portion of the particular or key vector object 306, a portion of the second vector object 310, and a portion of the third vector object 312 included in the modified fourth region 514 in the visual order denoted K, D, 0; the display module renders a portion of the particular or key vector object 306, a portion of the second vector object 310, and a portion of the third vector object 312 included in the modified fifth region 516 in the visual order denoted O, K, D; and the display module 206 renders a portion of the particular or key vector object 306, a portion of the second vector object 310, and a portion of the third vector object 312 included in the sixth region 512 in the visual order denoted O, D, K. For example, the display module 206 clears the offscreen render surface at 616.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which a visual order as between a portion of a first vector object and a portion of a second vector object included in a region is determined and a modified visual order as between the portion of the first vector object and the portion of the second vector object is determined based on the visual order.

Input data is received describing a region specified relative to a group of vector objects that includes a portion of a first vector object and a portion of a second vector object (block 702). For example, the computing device 102 implements the order module 110 to receive the input data. A visual order as between the portion of the first vector object and the portion of the second vector object is determined within the region (block 704). In one example, the order module 110 determines the visual order as between the portion of the first vector object and the portion of the second vector object within the region.

A modified visual order as between the portion of the first vector object and the portion of the second vector object within the region is computed based on the visual order (block 706). The computing device 102 implements the order module 110 to compute the modified visual order as between the portion of the first vector object and the portion of the second vector object in some examples. The group of vector objects is generated for display in a user interface using a render surface and a sentinel value to render pixels of the portion of the first vector object and the portion of the second vector object in the modified visual order (block 708). For example, the order module 110 generates the group of vector objects for display in the user interface.

Figure 8A:
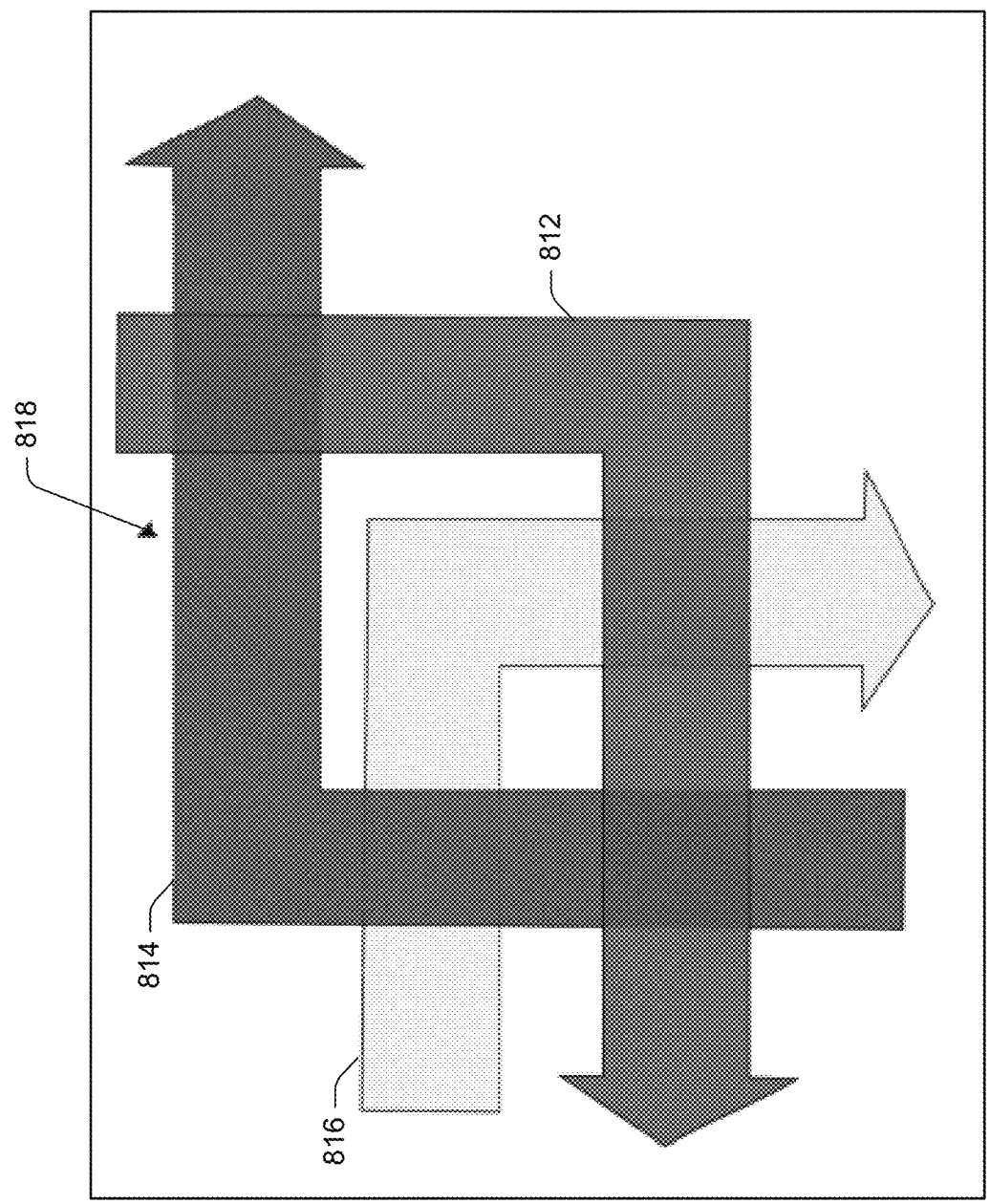
Figure 8B:
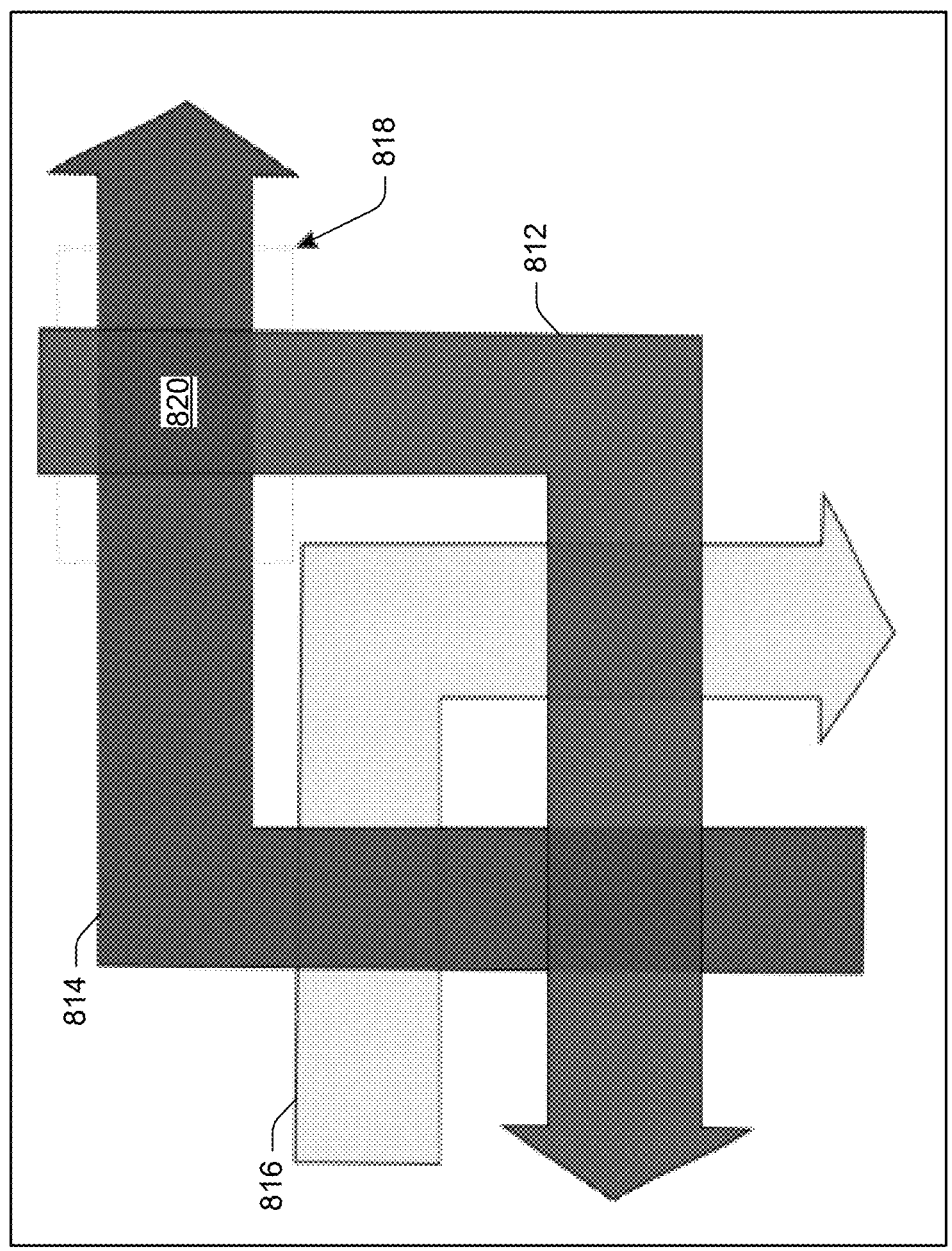
Figure 8C:
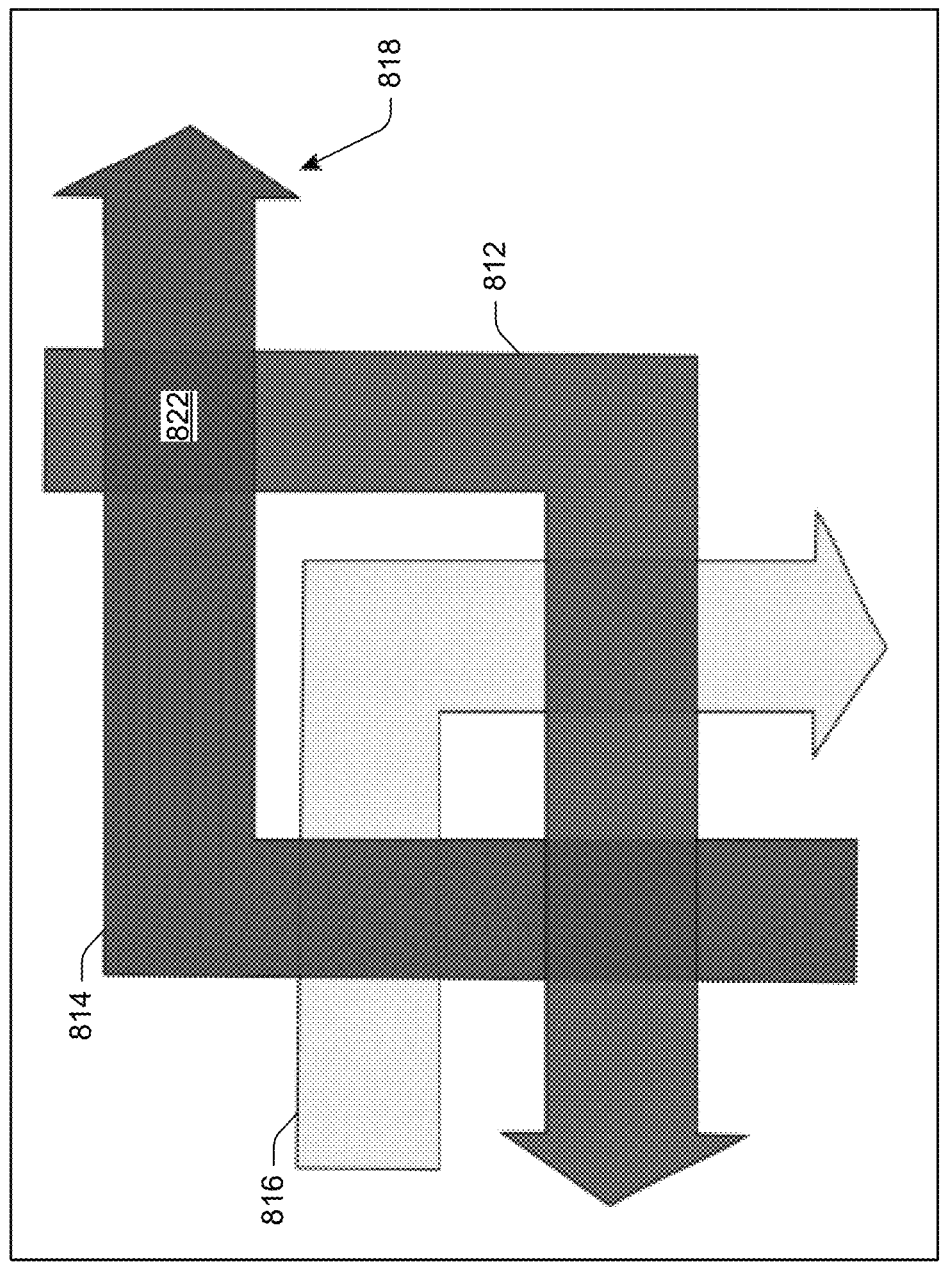
Figure 8D:
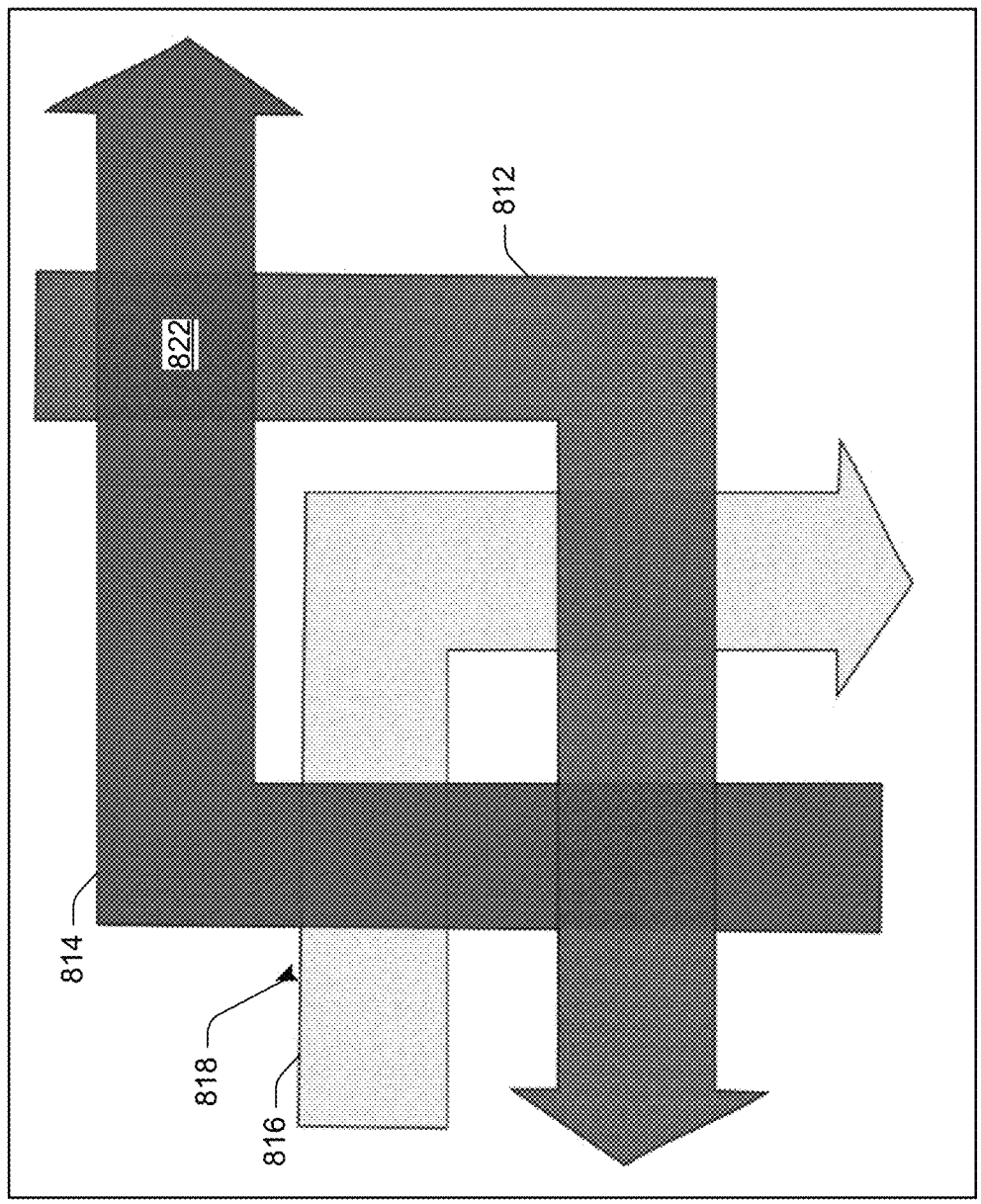
Figure 8B:
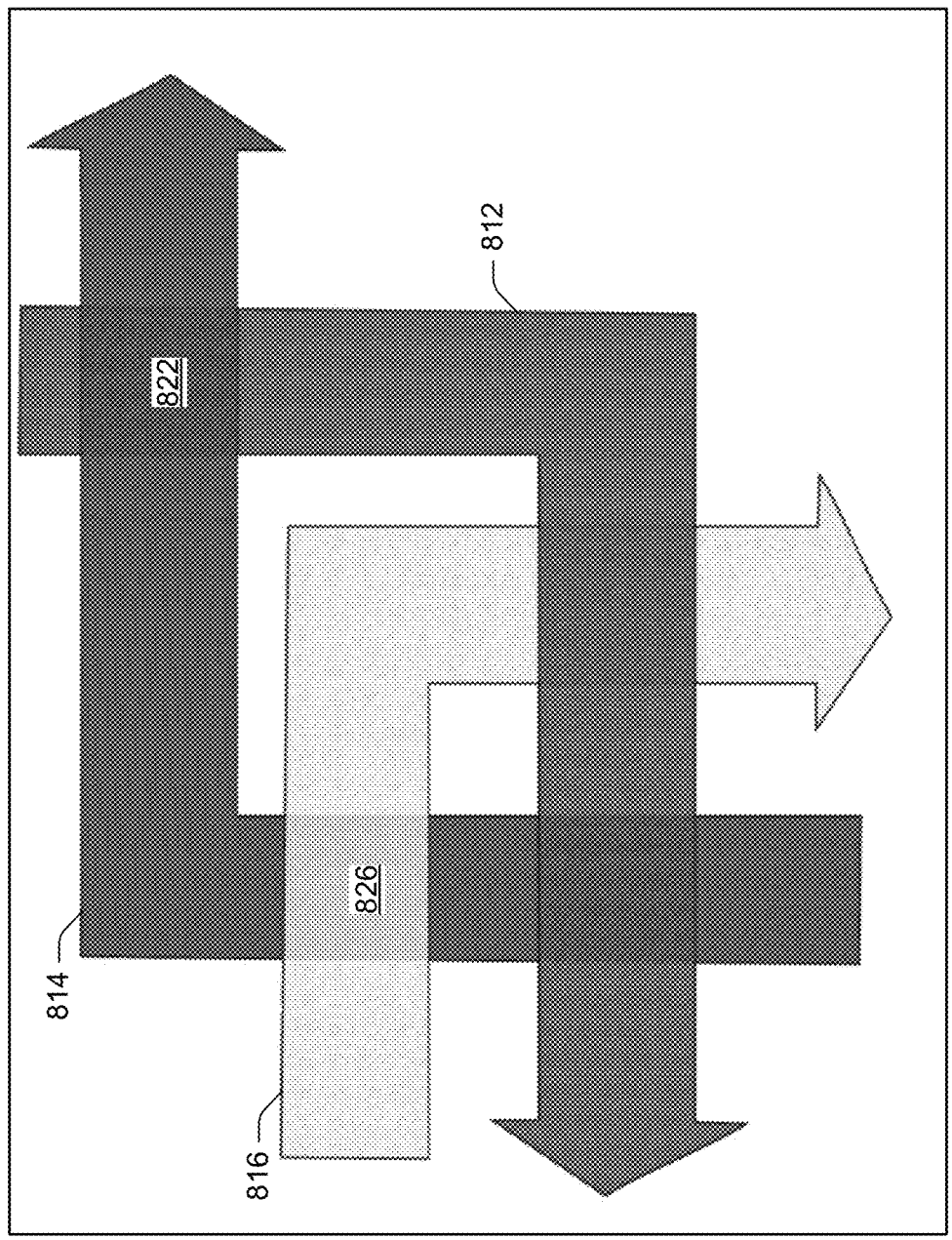

FIGS. 8A, 8B, 8C, 8D, 8E, and 8F illustrate a representation of an example user interface for visual reordering of partial vector objects. FIG. 8A illustrates a representation 800 of vector objects displayed in a user interface. FIG. 8B illustrates a representation 802 of a user interacting with an input device to specify a first region that includes a portion of a first vector object and a first portion of a second vector object in an input visual order. FIG. 8C illustrates a representation 804 of the first region having the portion of the first vector object and the first portion of the second vector object in a modified visual order. FIG. 8D illustrates a representation 806 of the user interacting with the input device relative to the user interface. FIG. 8E illustrates a representation 808 of the user interacting with the input device to specify a second region that includes a portion of a third vector object and a second portion of the second vector object in an input visual order. FIG. 8F illustrates a representation 810 of the second region having the portion of the third vector object and the second portion of the second vector object in a modified visual order.

With reference to FIG. 8A, the representation 800 includes a first vector object 812, a second vector object 814, and a third vector object 816. In an example, the order module 110 receives the input data 116 as describing the first, second, and third vector objects 812, 814, 816. In this example, a user interacts with an input device (e.g., a stylus, a mouse, a touchscreen, a keyboard, etc.) relative to the user interface to manipulate a cursor 818 within the user interface. In the representation 802, the user manipulates the input device and the cursor 818 to specify a first region 820 that includes a portion of the first vector object 812 and a first portion of the second vector object 814 in a visual order in which the portion of the first vector object 812 is ordered before or above the first portion of the second vector object 814.

With respect to FIG. 8C, the order module 110 receives the interaction data 130 describing the specification of the first region 820 and the order module processes the interaction data 130 to generate a modified first region 822. As shown, the modified first region 822 includes the portion of the first vector object 812 and the first portion of the second vector object 814 in a modified visual order in which the first portion of the second vector object 814 is ordered before or above the portion of the first vector object 812. In the representation 806, the user further manipulates the input device relative to the user interface which manipulates the cursor 818 within the user interface.

As illustrated in FIG. 8E, the user interacts with the input device to specify a second region 824 that includes a second portion of the second vector object 814 and a portion of the third vector object 816 in a visual order in which the second portion of the second vector object 816 is ordered before or above the portion of the third vector object 816. For example, the order module 110 receives the interaction data 130 describing the specification of the second region 824. In this example, the order module 110 processes the interaction data 130 to generate a modified second region 826 that includes the second portion of the second vector object 814 and the portion of the third vector object 816 in a modified visual order in which the portion of the third vector object 816 is ordered before or above the second portion of the second vector object 814.

Example System and Device

Figure 9:
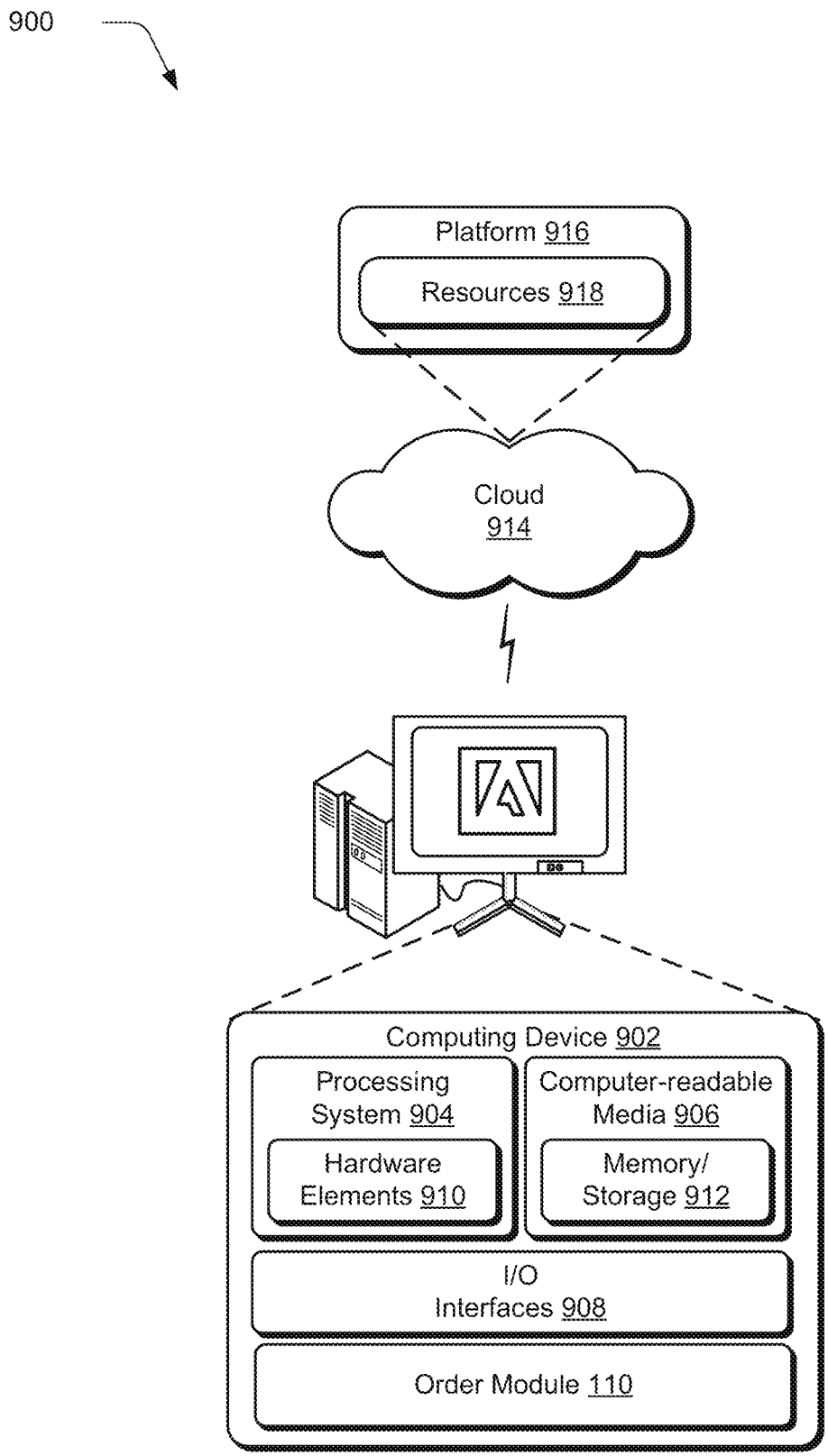
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the order module 110. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

Conclusion

Although implementations of systems for visual reordering of partial vector objects have been described in language specific to structural features and/or methods, it is to be understood that the appended claims are not necessarily limited to the specific features or methods described. Rather, the specific features and methods are disclosed as example implementations of systems for visual reordering of partial vector objects, and other equivalent features and methods are intended to be within the scope of the appended claims. Further, various different examples are described and it is to be appreciated that each described example is implementable independently or in connection with one or more other described examples.

What is claimed is:

1. A method comprising:
   receiving, by a processing device, input data describing a region specified relative to a group of intertwined vector objects that includes a portion of a first vector object and a portion of a second vector object;
   determining, by the processing device, a visual order as between the portion of the first vector object and the portion of the second vector object within the region;
   computing, by the processing device, a modified visual order as between the portion of the first vector object and the portion of the second vector object within the region different than the visual order;
   marking pixels within the region with a sentinel value that denotes pixels to be rendered in accordance with the modified visual order; and
   generating, by the processing device, the group of intertwined vector objects for display in a user interface using a render surface and the sentinel value to render pixels of the portion of the first vector object and the portion of the second vector object marked with the sentinel value in the modified visual order and preserve the visual order for pixels of the group of intertwined vector objects outside of the region.

2. The method as described in claim 1, wherein generating the group of intertwined vector objects for display in the user interface includes using the render surface to render pixels of the group of intertwined vector objects that are outside of the region in a z-order of an input render tree.

3. The method as described in claim 2, wherein the sentinel value identifies the pixels of the portion of the first vector object and the portion of the second vector object or the pixels of the group of intertwined vector objects that are outside of the region.

4. The method as described in claim 1, wherein the modified visual order is computed based on determining that the first vector object is a topmost or a bottommost vector object within the region.

5. The method as described in claim 1, wherein the region includes a portion of a third vector object that is ordered after the portion of the first vector object and before the portion of the second vector object in the visual order and wherein the portion of the third vector object is ordered before the portion of the first vector object and before the portion of the second vector object in the modified visual order.

6. The method as described in claim 5, wherein the portion of the first vector object is ordered before the portion of the second vector object in the modified visual order.

7. The method as described in claim 1, further comprising:
   rasterizing the region into the render surface;
   rendering pixels of vector objects included in the group of intertwined vector objects that are not marked with the sentinel value in a z-order of an input render tree; and
   rendering pixels that are marked with the sentinel value in the modified visual order.

8. The method as described in claim 1, wherein the region overlaps an existing region specified relative to the group of intertwined vector objects that includes an additional portion of the first vector object and an additional portion of the second vector object.

9. The method as described in claim 8, wherein a visual order as between the additional portion of the first vector object and the additional portion of the second vector object within the existing region is different from the visual order as between the portion of the first vector object and the portion of the second vector object within the region and wherein another modified visual order is computed as between the additional portion of the first vector object and the additional portion of the second vector object within a new region generated for an overlapping portion of the region and the existing region.

10. A system comprising:
    a memory component; and
    a processing device coupled to the memory component, the processing device to perform operations including:

receiving input data describing a group of vector objects that includes at least one intertwine group and a region specified relative to the group of vector objects that includes a portion of a first vector object and a portion of a second vector object;

determining a visual order as between the portion of the first vector object and the portion of the second vector object within the region;

computing a modified visual order as between the portion of the first vector object and the portion of the second vector object within the region based on the visual order; and generating the group of vector objects for display in a user interface using a render surface to render pixels within the region in the modified visual order and preserve the visual order for pixels of the group of vector objects outside of the region.

11. The system as described in claim 10, wherein the operations further include generating the group of vector objects for display in the user interface using the render surface to render pixels of the group of vector objects that are outside of the region in a z-order of an input render tree.

12. The system as described in claim 10, wherein the modified visual order is computed based on determining that the first vector object is a topmost or a bottommost vector object within the region.

13. The system as described in claim 10, wherein the region overlaps an existing region specified relative to the group of vector objects that includes an additional portion of the first vector object and an additional portion of the second vector object.

14. The system as described in claim 13, wherein a visual order as between the additional portion of the first vector object and the additional portion of the second vector object within the existing region is a same visual order as the visual order as between the portion of the first vector object and the portion of the second vector object within the region and wherein the region is merged with the existing region.

15. A non-transitory computer-readable storage medium storing executable instructions, which when executed by a processing device, cause the processing device to perform operations comprising:

receiving interaction data describing an operation that changes a visual order as between a portion of a first vector object and a portion of a second vector object included in a region specified relative to a group of intertwined vector objects from an input visual order to a modified visual order;

rasterizing the region into a render surface;

marking pixels of the portion of the first vector object and the portion of the second vector object with a sentinel value that denotes pixels to be rendered in accordance with the modified visual order; and generating the group of intertwined vector objects for display in a user interface using the render surface to render pixels that are marked with the sentinel value in the modified visual order and preserve the input visual order for pixels not marked with the sentinel value.

16. The non-transitory computer-readable storage medium as described in claim 15, wherein generating the group of intertwined vector objects for display in the user interface includes using the render surface to render pixels of vector objects included in the group of intertwined vector objects that are not marked with the sentinel value in a z-order of an input render tree.

17. The non-transitory computer-readable storage medium as described in claim 15, wherein the region includes a portion of a third vector object that is ordered after the portion of the first vector object and before the portion of the second vector object in the input visual order and wherein the portion of the third vector object is ordered before the portion of the first vector object and before the portion of the second vector object in the modified visual order.

18. The non-transitory computer-readable storage medium as described in claim 17, wherein the portion of the first vector object is ordered after the portion of the second vector object in the modified visual order.

19. The non-transitory computer-readable storage medium as described in claim 15, wherein the operations further comprise receiving additional interaction data describing an added region specified relative to the group of intertwined vector objects that overlaps the region and includes an additional portion of the first vector object and an additional portion of the second vector object.

20. The non-transitory computer-readable storage medium as described in claim 19, wherein a visual order as between the additional portion of the first vector object and the additional portion of the second vector object within the added region is a same visual order as the modified visual order as between the portion of the first vector object and the portion of the second vector object within the region and wherein the added region is merged with the region.

* * * * *